Aug. 11, 1964     M. R. GEROW     3,144,494
MANUFACTURE OF PLASTIC FILM AND TUBING
Filed Feb. 15, 1955     2 Sheets-Sheet 1
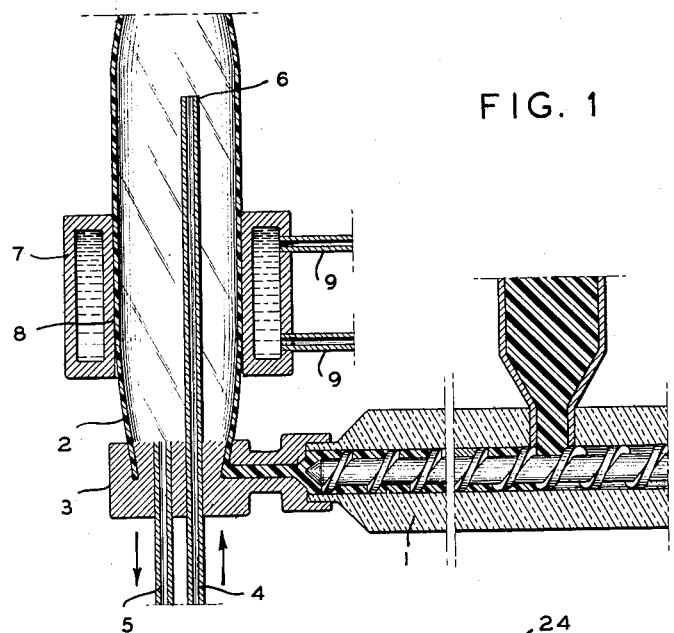
FIG. 1
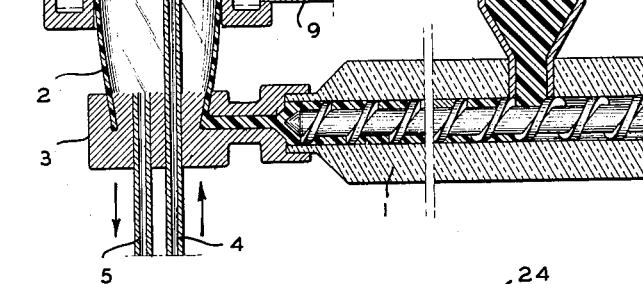
FIG. 4
FIG. 2
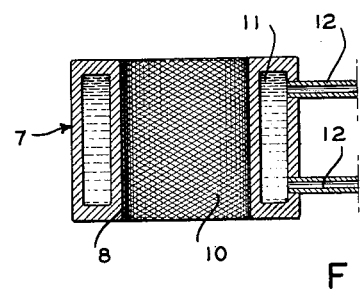
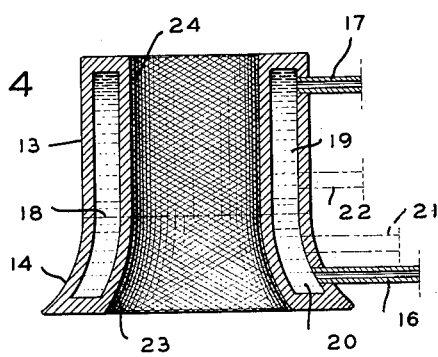
FIG. 5
FIG. 3
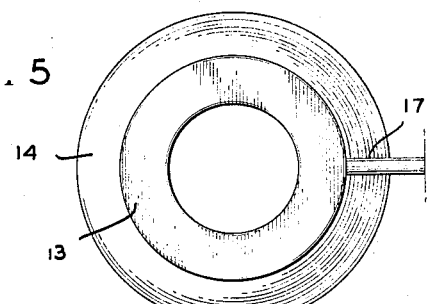
INVENTOR
MILO R. GEROW
BY Sol Shapiro
ATTORNEY Aug. 11, 1964   M. R. GEROW   3,144,494
MANUFACTURE OF PLASTIC FILM AND TUBING
Filed Feb. 15, 1955   2 Sheets-Sheet 2

INVENTOR
MILO R. GEROW
BY Sol Shappirio
ATTORNEY

United States Patent Office 3,144,494
Patented Aug. 11, 1964

3,144,494
MANUFACTURE OF PLASTIC FILM
AND TUBING
Milo R. Gerow, 74 South Mountain Ave., Montclair, N.J.
Filed Feb. 15, 1955, Ser. No. 488,307
2 Claims. (Cl. 264—95)

This invention relates to the production of synthetic resinous thermoplastic tubing and sheeting and to methods, machines and instrumentalities for the production of such tubing and sheeting particularly by blowing operations.

In blowing operations heretofore used in the art for the production of tubing from thermoplastic materials, inaccuracies of gauge control, air pressure control and cooling, plague the industry and result in a large amount of scrap material due to breakage, off-gauge, and variation in width since tolerances cannot be accurately controlled.

Among the objects of the present invention is the production of tubing and sheeting from synthetic resinous thermoplastic materials within well maintained tolerances, that substantially eliminate the difficulties heretofore encountered in prior art processes employing blowing operations for such production.

Further objects include methods, machines and instrumentalities for producing such tubing and sheeting.

Still further objects and advantages of the present invention will appear from the more detailed description set forth below, it being understood that such more detailed description is given by way of illustration and explanation only, but not by way of limitation, since various changes therein may be made by those skilled in the art, without departing from the scope and spirit of the present invention.

In connection with that more detailed description, the drawings show the following:

FIGURE 1 is a schematic elevation of an apparatus utilizable in the present invention.

FIGURE 2 is a vertical section of a former used in controlling the size of blown tubing.

FIGURE 3 is a vertical section of the former of FIGURE 2.

FIGURE 4 is a side elevation of a modified type of former.

FIGURE 5 is a top plan view thereof.

Figure 6:
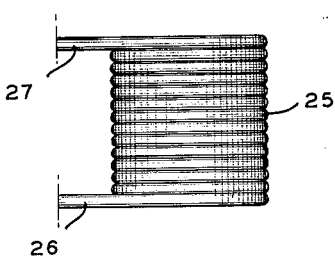
FIGURE 6 is a side elevation of a further modified type of former.

In accordance with the present invention, heated synthetic resinous tubing is extruded in non-self-sustaining condition into a hollow former having an internal diameter of the size desired in the finished tubing, while a gas, usually air, is introduced under pressure within the tubing while in non-self-supporting condition to blow or expand the tubing into contact with the internal walls of the former, while circulating a coolant within the hollow former to cool the thermoplastic slowly, to at least, partially set condition by the time the tubing emerges from the former and withdrawing the tubing for recovery as such or converting by slitting to sheet form and collection as such.

It has been found that in such production the prior art difficulties encountered in the production of blown tubing may be substantially eliminated by treatment of the surfaces of the former which contact the tubing in non-self-sustaining condition so that such surfaces are discontinuous. By breaking up the surface contact in this way, the substantially molten thermoplastic may be produced within a former in contact therewith. Of course the cooling effect of the former bringing the blown tubing to at least partially set condition should be gradual and not chill the film to a point to interfere with continuous operation.

The discontinuous surfaces may be produced in any desired way as for example by ruling or otherwise producing a lined surface. Such lined surface may be formed utilizing fine or coarse lines at any desired interval. For example fine lines may be ruled to give a knurl design with 200 lines per inch, or 400 lines per inch, etc. Or the number of lines may be materially reduced in number. The actual surface discontinuity employed may vary substantially and in part depends on the thermoplastic being treated, the temperature employed, the rate of cooling, the nature of the surface contact, etc. Fine sand blasting before or after chrome plating have also proved to be excellent.

Any type of extrudable synthetic resinous thermoplastic may be employed such as polyethylene, polyvinyl, vinyl copolymers, cellulose esters and ethers such as cellulose acetate, cellulose acetate butyrate, ethyl cellulose, benzyl cellulose, nylon type resins etc.

The former may be of any desired heat conducting material, but if desired, in order to reduce the rate of cooling obtained, the surfaces of the former may be treated with materials to reduce its heat conductivity to some extent. Or, to improve wear characteristics, the discontinuous surface may be metal plated, as with chromium, without destruction of the discontinuity.

Extrusion and production of tubing may take place upwardly or downwardly and operation may be modified to get better control depending upon direction of such operation. Thus where the tubing is extruded and processed upwardly, the gas injected into the tubing during its production to prevent collapse thereof while in non-self-supporting condition, is desirably introduced into the tubing at a point substantially removed from the point of extrusion, and withdrawn adjacent the extrusion zone. On the other hand in extrusion downwardly, the supporting gas is desirably released in the tubing adjacent the extrusion zone and withdrawn at a point substantially removed therefrom.

Referring to the apparatus illustrated in the drawing, in FIGURE 1, any conventional extruder 1 may be employed desirably of cross-head type tubing 2 being delivered from die 3. The tubing at this point is in substantially molten condition and is not self-supporting. A gas, usually air, is introduced through entry pipe 4 and removed through exit pipe 5. Since the tube formation is upwardly it is desirable to carry pipe 4 upwardly to a point 6 substantially removed from die 3 while pipe 5 permits removal of the gas adjacent extrusion die 3. Such gas supports the tubing while in non-self-supporting condition and the arrangement illustrated insures adequate circulation of the gas within the tubing and maintenance of substantially uniform pressure conditions therein. If extrusion and tube formation is downwardly, the gas (air) circulation is desirably reversed so that ingress of air is permitted adjacent extrusion die 3 and its removal at a point substantially removed from die 3.

Tubing 2 while being extruded from die 3 in non-self-sustaining condition passes into hollow former 7 within which the tubing is blown up or expanded by the air or other gas pressure introduced into the tubing as set forth above, so that the tubing contacts inner walls 8 of former 7. A cooling medium e.g. water, is supplied to hollow former 7 through inlet and outlet 9, 9. Circulation may be in either direction. The temperature control should be such that tubing 2 as it emerges from the outer end of former 7 is in at least partially set condition where it will retain its desired size. The length of the former and the temperature gradients should be such as to secure this effect.

Walls 8 are discontinuous as at 10 illustrated by knurled lines for purposes set forth above. The hollow former illustrated in FIGURES 2 and 3 includes a cylindrical torus 11 having coolant chamber with coolant entry and exit pipes 12. Former 13 illustrated in FIGURES 4 and 5 is substantially like that of FIGURES 2 and 3 at its upper end, while forward end 14 is flared outwardly so that the blown tubing emerging from die 3 is reduced down to the desired size in the former more gradually. The type of former illustrated in FIGURES 2 and 3 usually requires more careful control of the air pressure supply, while the former shown in FIGURES 4 and 5 permits more latitude in this connection while avoiding undesirable over blowing or under blowing. As illustrated, the former of FIGURES 4 and 5 may be made as a single unit having but one pair of coolant supply and removal pipes 16 and 17. Or such formers may be made in co-operating sections separated for example along line 18 with separate coolant zones 19, 20 in the respective sections and additional coolant supply and removal pipes 21, 22. In the latter structures, the temperatures maintained in the separate sections may be the same or different, desirably decreasing in the direction of tubing formation. Inner walls 23 and 24 may be of the character discussed above for inner walls 10 of the former of FIGURES 2 and 3.

A different type of former is shown in FIGURE 6 in the form of a pipe coil 25, desirably of copper, the inner channel of the coil acting as the former while pipe ends 26, 27 serve for coolant introduction and removal. Coil 25 may have its internal walls treated as discussed above for walls 10, 23 and 24, but this is not essential since the pipe convolutions act to give sufficient discontinuity. Coil 25 may be shaped as desired where being produced and may for example be formed with a flaring end like 14 of FIGURE 4.

Figure 7:
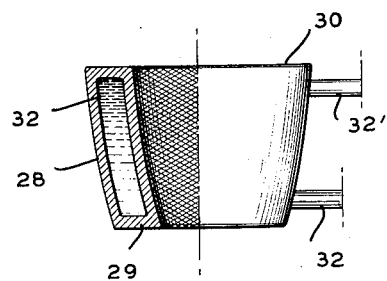
FIGURE 7 is a side elevation of a section to enclose tubing being extruded.

Protector 28 as shown in FIGURE 7 may be used to enclose extruded tubing 2 as it emerges from die 3. It may, as illustrated, diverge from end 29 toward end 30 to conform at those ends with the contour of die 3 or former 7 respectively, or any other former with which it is used. Protector 28 may have cooling or heating chamber 31 as desired with necessary inlet and outlet pipes 32, 32' if desired. However protector 28, it should be noted, does not contact tubing 2. Its walls may be treated however to modify its heat conducting properties.

Figure 8:
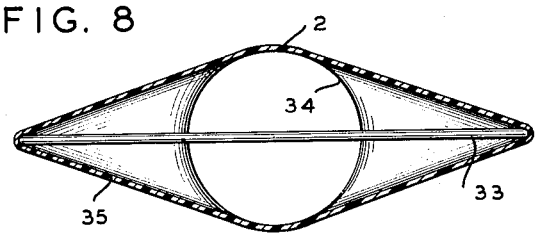
FIGURE 8 is a top plan view illustrating a spreader for collapsing tubing to flattened condition.
Figure 9:
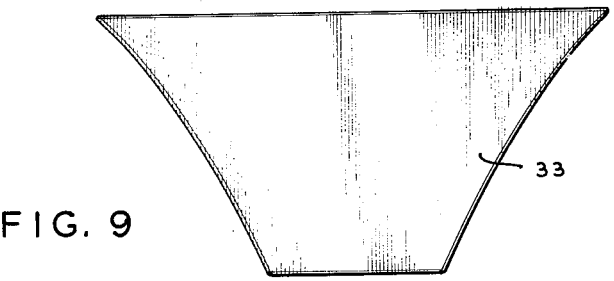
FIGURE 9 is a side elevation thereof.
Figure 10:
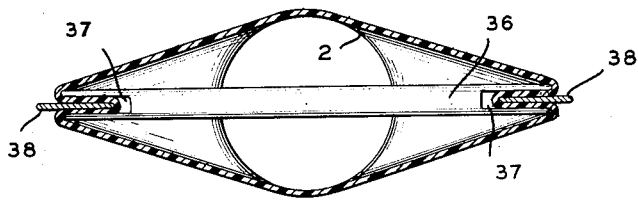
FIGURE 10 is a top plan view of a spreader and gusseting element.

Tubing 2 emerges from former 7 (FIGURE 2) or any other former used, in set or partially set condition. Generally it will be collapsed to flattened condition before being drawn off by pinch rolls (not shown) and would on a core. In such case it is usually flattened for wind-up purposes. Spreader 33 (FIGURES 8 and 9) may be supported internally of the tubing (as from die 3 by means conventional in the art and not here shown) to collapse tubing 2 to the desired shape. For this purpose tubing 2 being drawn off by the pinch rolls is converted from its circular cross-section at 34 to elongated oval form indicated at 35 into lay-flat tube before entering the pinch rolls. Or as shown in FIGURE 10, spreader 36 may function similarly to spreader 33 of FIGURE 8, but gusseting may be obtained by having recess 37 in each end of spreader 36 and vane 38 on each side to depress tubing 2 into recess 37 to produce a gusset in conventional fashion before such flat gusseted tubing is drawn into the pinch rolls for wind-up. Or if desired tubing 2 may be split by conventional means into sheeting and wound up as such. In general, the invention can be utilized with any thermoplastic material and mixture of synthetic rubbers with thermoplastic materials. Each thermoplastic substance or composition or composition possesses certain properties which may make it necessary to determine, by experiment, the extent that the variables have to be balanced in order to produce tubing of the desired character. This may be especially so with regard to the quantity cooling water and the volume of supporting air, since the temperature at the lips of the die may be different with different thermoplastic substances or compositions. Also the gauges (weight of the material to be supported) and its apparent resistance or cohesion will help to decide the air pressure needed. Hereinafter, is set forth illustrative thermoplastic materials which can be used in this invention, illustrative temperatures of the melt at the lips of the die being given as well as their thermal contraction:

| Material | Temperature of Melt at the die lips | Mold Shrinkage (SPI Handbook) |
| --- | --- | --- |
| Cellulose Acetate Butyrate | 220-380 | 0.003-0.009 |
| Cellulose Acetate (low Acetal) | 330-330 | 0.004-0.003 |
| Cellulose Acetate (high Acetal) | 450-550 | |
| Ethyl Cellulose | 400-420 | 0.004-0.006 |
| Methyl Methacrylate Polymer | 460-490 | 0.001-0.005 |
| Nylon extrusion and Molding Grade | 480-520 | 0.001- |
| Polystyrene | 450-490 | 0.002-0.008 |
| Polyvinyl Formal-acetate butyral | 300-340 | |
| Copolymers of vinyl chloride and Vinyl acetate "Vinylite" | 270-370 | 0.002-0.010 |
| Polyvinyl chloride ("Geon," "Ultron") | 270-370 | 0.015-0.017 |
| Vinylidene chloride ("Saran") | 310-370 | 0.004-0.012 |

Though the results can be obtained when the temperature of the thermoplastic at the lips of the die is as given above, the temperature at the lips can be much higher and also lower than the figures given. The maximum temperature used will depend upon the thermoplastic being used, its stability to overheating, the length of time it is subjected to the high heat and its decomposition temperature.

Actual operating conditions may be those in the specific examples of my prior application Serial No. 274,191, filed February 29, 1952, entitled "Methods and Machines for Producing Tubing and Sheeting," of which the present application is a continuation-in-part, that application now being patented, Patent No. 2,720,680. All of the operating conditions there set forth are applicable here also, for example, with respect to temperature, length of former, etc. Control of non-cooling of the extruded plastic may be obtained for example by varying (1) Speed of plastic over surface or speed of pull rolls against extruder speed.

(2) Gauge of material.

(3) Temperature of coolant.

The examples of the said prior application may be utilized as examples here, the only change being the utilization of a hollow former having an internal diameter of the size desired in the finished tubing, the surfaces of the former which contact the tubing in non-self-sustaining condition being discontinuous, produced as hereinabove set forth.

Having thus set forth my invention, I claim:

1. In a method of producing synthetic resinous thermoplastic tubing and sheeting, the steps consisting essentially in extruding heated synthetic resinous thermoplastic tubing in non-self-supporting condition into a hollow former of heat conductive material and having an internal diameter of the size of tubing desired, introducing a gas under pressure within the tubing as extruded to blow the tubing to the internal size of the former, there being no fluid introduced between the tubing and former, the surface of the former in contact with the tubing while in non-self-sustaining condition being discontinuous, circulating a coolant within the hollow former, to cool the thermoplastic slowly to at least partially set condition by the time that the tubing emerges from the former, and withdrawing the formed tubing in which the former is a pipe of copper coil having a number of turns in substantial sidewise contact with one another, the ends of the coil serving as inlet and outlet respectively for a fluid circulated internally through the coil.

2. In apparatus for producing synthetic resinous thermoplastic tubing and sheeting, an extruder for extruding heated synthetic resinous thermoplastic tubing in non-self-sustaining condition, a hollow former of heat conductive material to receive tubing when extruded while in non-self-sustaining condition in direct contact with the former and without introducing fluid between former and tubing, conduits for circulating a gas under pressure within such tubing to expand such tubing to the internal size of the former, the surface of the former in contact with such tubing when being extruded in non-self-sustaining condition being discontinuous, and conduits for circulating a coolant within the hollow former in which the former is a pipe of copper coil having a number of turns in substantial sidewise contact with one another, the ends of the coil serving as inlet and outlet respectively for a fluid circulated internally through the coil.

References Cited in the file of this patent

UNITED STATES PATENTS

| | | |
|---|---|---|
| 2,047,554 | Fischer | July 14, 1926 |
| 2,194,313 | Loomis | Mar. 19, 1940 |
| 2,519,375 | Jargstorff et al. | Aug. 22, 1950 |
| 2,545,300 | Nixon | Mar. 13, 1951 |
| 2,631,332 | Reber | Mar. 17, 1953 |
| 2,641,022 | Kress | June 9, 1953 |
| 2,668,324 | Johnson | Feb. 9, 1954 |
| 2,669,752 | Pratt | Feb. 23, 1954 |
| 2,799,896 | Grow et al. | July 23, 1957 |

FOREIGN PATENTS

| | | |
|---|---|---|
| 445,974 | Great Britain | Apr. 22, 1936 |